United States Patent [19]

Kreuter

[11] 4,013,552
[45] Mar. 22, 1977

[54] SEWAGE TREATMENT PROCESS
[75] Inventor: Jacob Kreuter, Hazlet, N.J.
[73] Assignee: Ecquacon Corporation, Matawan, N.J.
[22] Filed: Feb. 3, 1975
[21] Appl. No.: 546,287

Related U.S. Application Data

[63] Continuation of Ser. No. 281,843, Aug. 18, 1972, abandoned.
[52] U.S. Cl. .................... 210/12; 210/15; 210/19; 210/63 R; 210/DIG. 22
[51] Int. Cl.² ................ C02C 1/02; C02C 5/04
[58] Field of Search ............ 21/1, 2, 10, 12, 15, 21/17, 19, 63, 64, 150–152, 198, 199, 205, 243, 259, 260, 542, DIG. 22; 210/1, 2, 10, 12, 15, 17, 19, 63, 64, 150–152, 198, 199, 205, 243, 259, 260, 542, DIG. 2

[56] References Cited

UNITED STATES PATENTS

| 2,417,722 | 3/1947 | Wolff | 21/54 A |
|---|---|---|---|
| 3,523,076 | 8/1970 | Goerz et al. | 210/64 |
| 3,594,115 | 7/1971 | Wesley et al. | 21/54 A |
| 3,625,884 | 12/1971 | Waltrip | 210/19 |
| 3,630,377 | 12/1971 | Brooks | 210/19 |
| 3,672,823 | 6/1972 | Boucher | 21/54 A |
| 3,686,115 | 8/1972 | Farman et al. | 210/19 |
| 3,772,188 | 11/1973 | Edwards | 210/15 |

*Primary Examiner*—Thomas G. Wyse
*Attorney, Agent, or Firm*—Carella, Bain, Gilfillan & Rhodes

[57] ABSTRACT

Ultrasonic energy is transmitted to sewage, including, inter alia, liquid or waste water, organic solid matter and aerobic bacteria, to reduce the liquid particle size and enrobe the reduced water particles with air to enhance the air to liquid absorption of the liquid and thereby provide (a) the aerobic bacteria with additional oxygen to utilize in the process of oxidation whereby the aerobic bacteria convert the organic solid matter to a more stable form or compound; (b) the effluent of sewage treatment plants with a higher oxygen content sufficient to aid or sustain desirable aquatic life. In a further embodiment, the liquid is first coverted to a thin film and then subjected to ultrasonic energy. In a still further embodiment, the sewage is first preheated to enhance the aerobic organism or bacteria activity.

In a still further embodiment the air is preheated and/or hydrated to diminish heat loss and thus a temperature drop, by the liquid.

Additionally, the synergistic effects of ultrasonic energy and ultraviolet energy are utilized to sensitize microorganisms which may then be easily destroyed by chemicals, and/or radiati on and/or other means.

Still further, the synergistic effects of ultrasonic and microwave energy are utilized to decontaminate the surface of sewage liquid and solids, the ultrasonic energy is utilized to produce a humid atmosphere and the microwave energy provides surface decontamination.

7 Claims, 8 Drawing Figures

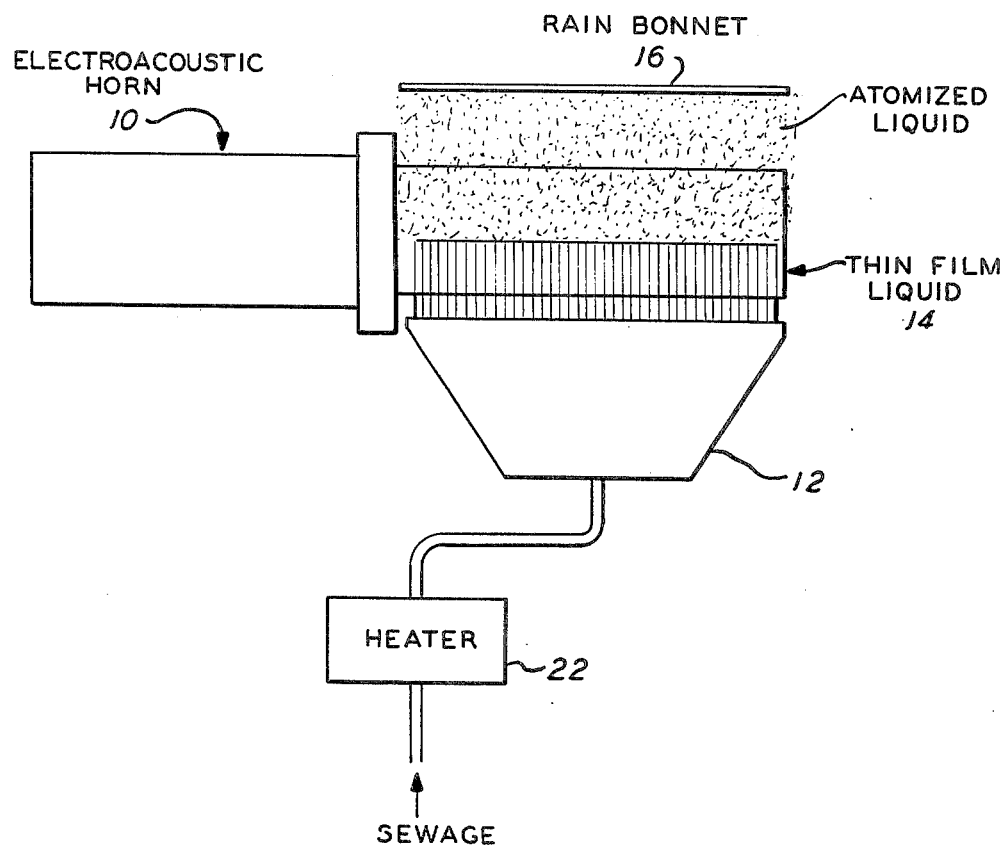
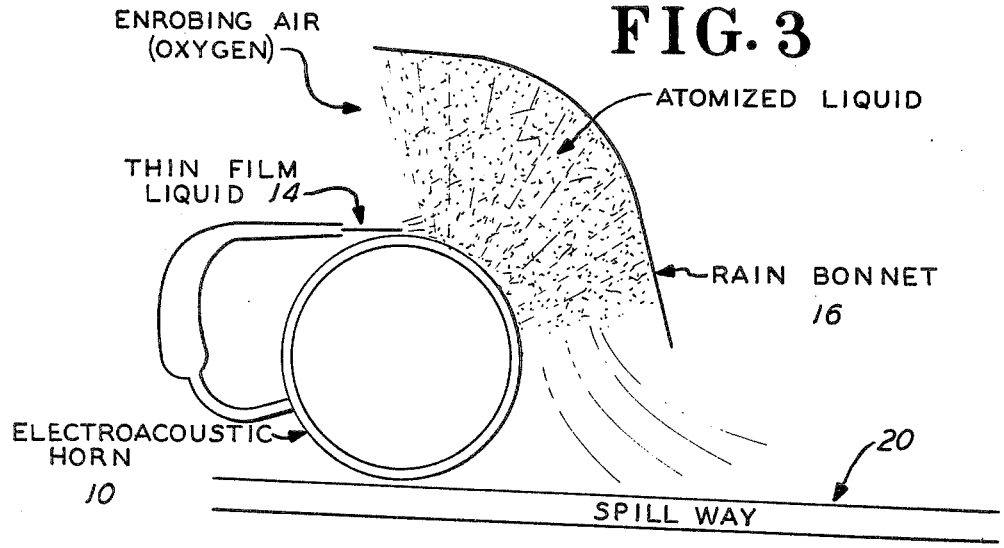

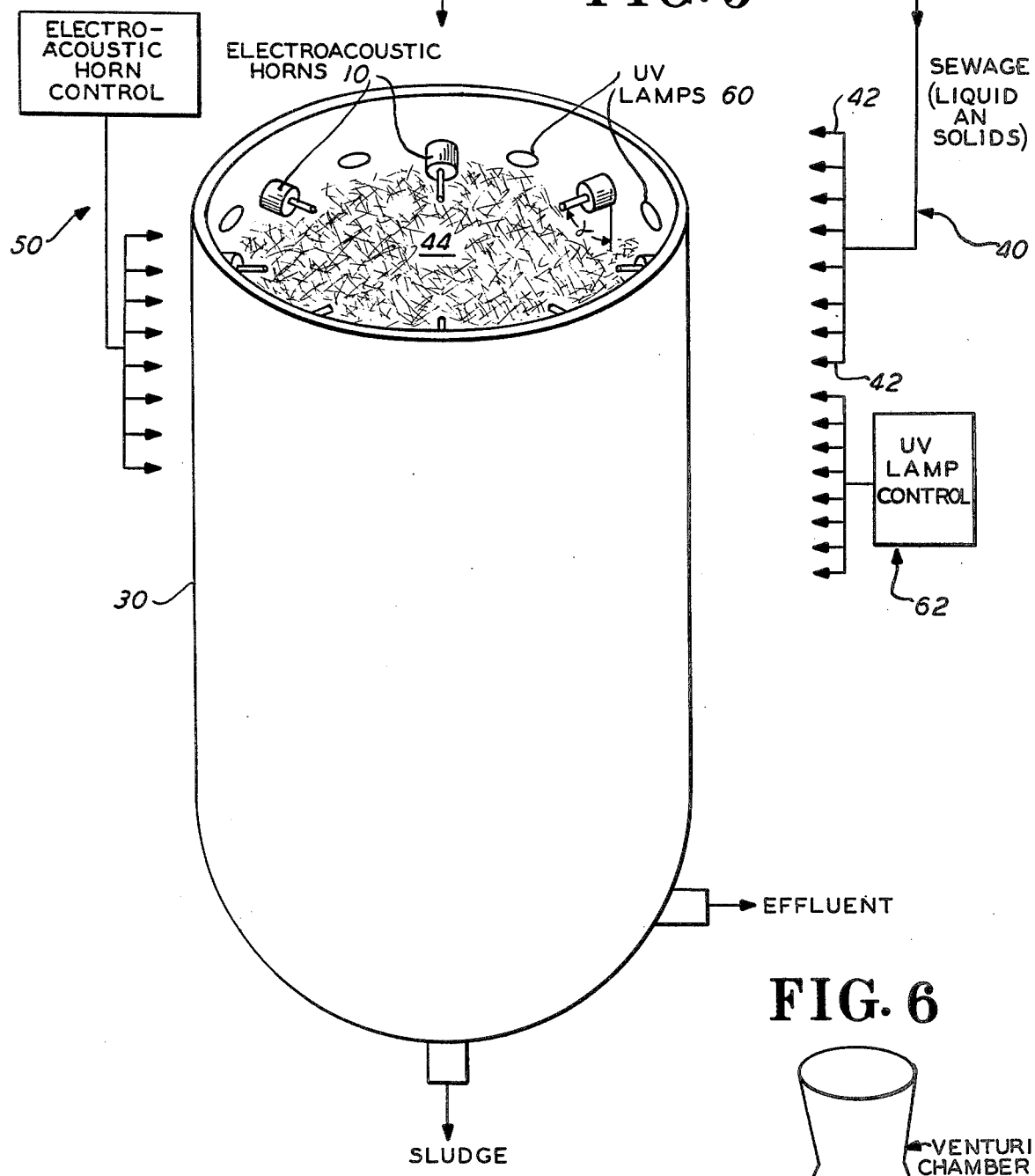

SEWAGE TREATMENT PROCESS

This is a continuation of application Ser. No. 281,843 filed Aug. 18, 1972, now abandoned.

BACKGROUND OF THE INVENTION

The treatment and disposal of sewage is universally recognized as an essential public service required in every community. The purpose of this service is to maintain an acceptable standard of sanitation and to insure maximum protection. But with the best of intentions maximum protection cannot always be maintained, primarily because of the population growth. As an example, a typical sewage treatment plant designed and built to handle a maximum of 500,000 gallons per day approximately 14 years ago now is compelled to operate at nearly 3 times its designed capacity or at a present rate of some 1.4 million gallons per day. A system once considered safe, 14 years ago, can no longer be expected to be operating at 3 times capacity safely. Thus, the effluent discharged from a typical sewage treatment plant is not harmless and, more realistically, is in fact unsatisfactorily treated. Thus, objectionable and even dangerous sewage effluent is being discharged into streams, rivers, lakes and oceans. The problem then presented is the operation of such a typical sewage treatment plant to be prohibited, especially when it is understood that the cost of such a plant 14 years ago was a quarter of a million dollars ($250,000) and the replacement cost of an identical plant today is approximately three quarters of a million dollars ($750,000). Obviously, small communities are committed to what they have. Hence, there is a compelling need to increase the sewage treating capacity of existing, overburdened sewage treatment plants at a reasonable price and in an acceptable manner.

Further, if the quality of the environment is to be upgraded, less costly and more efficient means of sewage treatment techniques must be introduced even in new or in the planning stage of new sewage plants.

Since water is used as a carrier for wastes, it constitutes by far the largest percent of the volume of sewage. The average domestic sewage is composed of approximately 99.9% water and 0.1% solid matter although these numbers may vary considerably from time to time and place to place. While waste matters or impurities of any kind present in sewage constitute only a small percentage of the total volume, their objectionable characteristics, their nature and significance must be understood. The solids are generally classified as organic solids and inorganic solids.

Organic solids: are wastes derived from plant or animal life and are termed organic matter. Organic matter are proteins, carbohydrates and fats. Because these organic solids are largely unstable they will putrefy to produce objectionable odors and create a health hazard. Their removal and stabilization is, therefore, the primary objective of sewage treatment.

Inorganic solids: the mineral present in the water supply, together with the sand, silt and other mineral matter that may find its way into sewers makes up the inorganic matter in sewage. Unless large amounts of these solids are present they do not normally present a treatment problem. Grit removal units are included in most conventional plants to remove suspended inorganic material thus preventing it from entering other plant units.

Referring again to the organic solids or matter, great numbers of bacteria are present in raw sewage. Some bacteria present are unwanted and harmful due to their ability to produce disease, such bacteria are referred to as pathogenic bacteria. Other bacteria present are harmless and in fact are helpful and useful; these are generally referred to as anaerobic bacteria and aerobic bacteria. Anaerobic bacteria are bacteria that thrive in the absence of free oxygen or air and these bacteria perform a vital role in sewage treatment by breaking down organic matter or solids in sewage and hence are utilized in sludge digestion processes. Aerobic bacteria are bacteria that require free oxygen for their life processes and these bacteria are particularly useful in the treatment of sewage due to their ability to oxidize and purify the sewage. More particularly, such aerobic bacteria consume, digest or burn the solid organic matter through the bio-chemical process wherein such aerobic bacteria or organisms in the presence of oxygen convert the organic matter or solids to a more stable form or compound thus preventing such organic matter from decomposing and putrefying.

SUMMARY

The present invention increases the efficiency and capacity of present sewage treatment or waste water systems so as to produce effluents suitable for safe discharge into streams, rivers, lakes and oceans.

In addition, the present invention provides new and useful sonobioaeration processes for treating sewage, in particular, for aiding and assisting the bio-chemical oxidation process wherein aerobic bacteria oxidize organic matter and convert the organic matter to a more stable form or compound. More particularly, ultrasonic energy is transmitted to sewage which includes liquid or waste water, organic solid matter and aerobic bacteria, to reduce the liquid particle size and enrobe the reduced water particles with air to enhance the air to liquid absorption of the liquid and thereby provide the aerobic bacteria with additional oxygen to utilize in the process of bio-chemical oxidation whereby the aerobic bacteria convert the organic matter to a more stable form or compound.

Further, the present invention provides new and useful processes for disinfecting, sanitizing and decontaminating sewage which includes liquid, primarily waste water, and solid matter.

More particularly, the synergistic effects of ultrasonic energy and ultraviolet energy are utilized to sensitize microorganisms present in sewage which sensitized microorganisms may then be easily destroyed by chemicals and/or radiation and/or other means.

Additionally, the synergistic effects of ultrasonic and microwave energy are utilized to decontaminate the surface of sewage liquid and solids, the ultrasonic energy being utilized to produce a humid atmosphere and the microwave energy being utilized to provide surface decontamination of the liquid and solid matter.

Upon the foregoing processes of the present invention being employed in existing sewage and water treatment plants, the capacity, efficiency and effectiveness of such sewage treatment plants are greatly enhanced and increased. Moreover, the foregoing noted processes and apparatus of the present invention may be beneficially utilized to treat sewage and waste water by being implemented as new processes for treating sewage and waste water in new or planned plants as well as ones already in existence.

DESCRIPTION OF THE DRAWINGS

FIG. 2 is a top view of a diagrammatic presentation illustrating the apparatus embodying the present invention and particularly useful for practicing certain processes of the present invention;

FIG. 3 is a diagrammatic presentation and is an end view of the apparatus of FIG. 2;

FIG. 5 is a diagrammatic presentation of apparatus embodying the present invention and which apparatus is particularly useful in practicing certain processes of the present invention;

FIG. 6 is a diagrammatic representation of certain alternative structure of FIG. 5;

DESCRIPTION OF THE INVENTION

Figure 1:
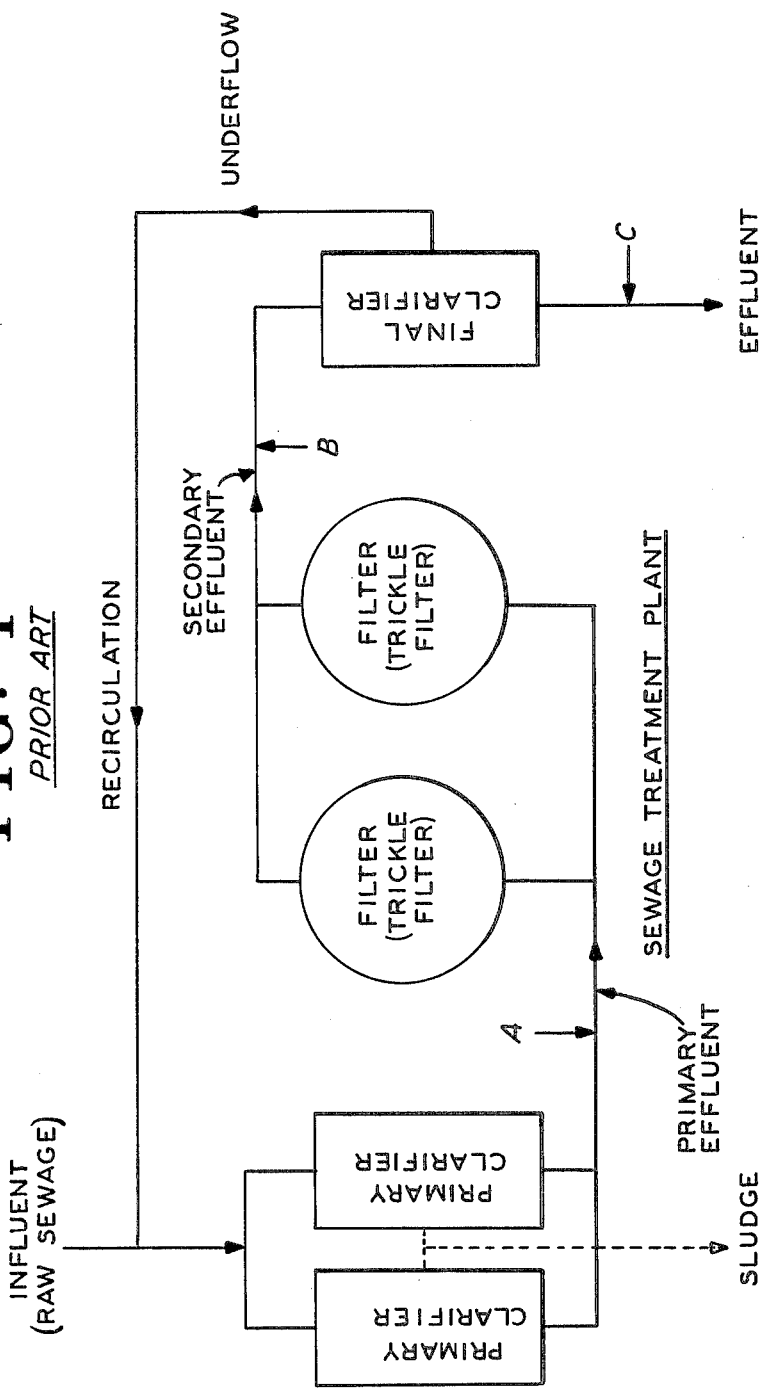
FIG. 1 is a diagrammatic representation of a typical prior art sewage or waste water treatment plant.

Referring now to FIG. 1, there is shown a diagrammatic illustration of a typical prior art sewage or waste water treatment plant. With regard to the expression "sewage," it will be understood by those skilled in the art that such expression is generally used in the art interchangeably with the expression waste water. However, it will be understood, as noted above, that in the context of this specification and the appended claims, the term sewage is used to describe wastes derived from dwellings, business houses, institutions and the like and which typically consist of 99.9% water and 0.1% organic and inorganic solids (which percentages may vary as noted above), and the various bacteria found in such sewage, in particular aerobic bacteria or organisms.

The influent of such typical sewage treatment plant is raw sewage and such raw sewage is passed into the first stage of the treatment plant which is typically referred to as the primary treatment or primary classifier stage. In the primary classifier stage, through the process of sedimentation, approximately 90% of the settleable solids and approximately 40–60% of the suspended solids are removed and exit the primary classifier stage as sludge. Additionally, silt and grit are removed and also exit the primary classifier stage as sludge. The sludge is then, typically, treated and/or disposed of by being dumped in the ocean or on appropriate land surfaces or dried. The sewage output of the primary classifier stage is typically referred to as primary effluent which is passed into the secondary treatment stage of the sewage system, which secondary treatment stage is sometimes referred to as the filter or trickle filter stage.

In the secondary stage the primary effluent sewage receives what is generally referred to as biological treatment by being aerated to provide the aerobic bacteria with oxygen to utilize in the bio-chemical oxidation process wherein the aerobic bacteria oxidizes the organic matter to convert the organic matter to a more stable form or compound. The output of the secondary or filter stage is generally referred to as the secondary effluent which is passed into the tertiary or final sewage treatment stage, typically referred to as the final clarifier, which is the final separation stage wherein chlorine is typically added to disinfect the sewage. The output of the final treatment or final clarifier stage is generally referred to as the sewage treatment plant effluent which is then sometimes discharged directly into streams, rivers, lakes and oceans.

As noted above, many sewage treatment plants presently in existence are sometimes operated upwards of three times their designed sewage treatment capacity. Hence, the sewage is either more concentrated than that for which the sewage treatment plant was designed, or, in order to at least partially process the greater capacity of sewage, the sewage must pass through the sewage treatment plant in less time than calculated in the initial design of the sewage treatment plant. Hence, the secondary effluent is typically deficient in the quantity of oxygen required for the desired performance of the aerobic bacteria in their bio-chemical oxidation of the organic solid or matter contained in the sewage. Further, it has been found that when the sewage is passed through the secondary or filter treatment stage in a time span less than used in calculating the initial design of the plant, the aerobic bacteria may have exhausted the supply of free oxygen in the sewage by the time the secondary effluent enters the final clarifier stage.

With regard to certain processes and apparatus of the present invention, and referring now to FIGS. 2 and 3, there are shown apparatus embodying the present invention and which apparatus is particularly useful in practicing certain processes of the present invention. More particularly, such apparatus includes an electroacoustic horn 10, such electroacoustic horn also being referred to in the art as a concentrator horn and velocity transformer. In addition, such apparatus may include apparatus 12 for receiving the sewage and for converting the sewage into a thin film 14. Upon the electroacoustic horn being suitably energized, the horn, as is known in the art, vibrates, and as shown in FIGS. 2 and 3, the thin film of sewage 14 is applied to the surface of the horn where ultrasonic energy is transmitted to the sewage thin film whereby the sewage thin film is atomized to reduce the particle size of the liquid and enrobe the reduced liquid particles with air to provide the aerobic organisms with additional oxygen, derived from the enrobed air, for the aerobic organisms or bacteria to utilize in the process of bio-chemical oxidation whereby the aerobic organisms convert the organic matter to a more stable form or compound. It will be noted that ultrasonic energy is transmitted to the thin film of sewage in the presence of air which air is the additional air with which the reduced liquid particles are enrobed.

Additionally, the apparatus may be provided with a rain bonnet 16 which collects the atomized sewage upon its impingement against the rainbonnet and the collected atomized sewage is converted again to liquid form and may be recieved by the spillway 20 and transmitted, for example, to a subsequent sewage treatment stage.

It has been found that the input sewage to the apparatus 12 for converting the sewage to a thin film, may be advantageously heated by suitable heating means 22 to enhance the activity of the aerobic organisms contained in the sewage. In accordance with the teaching of the present invention, it has been found that the sewage may be at a temperature of 98° F; the temperature of 98° F may be preexisting or may be achieved by pre-heating in suitable means 22.

It will be understood that in the context of the present specification and the appended claims, that the general expression "ultrasonic energy" is used to describe vibratory energy in the frequency range from 10kHz to 100kHz. Further that ultrasonic energy, or ultrasonic wave energy, may be brought into play in four major waves, through large variations of pressure, motion, heat degradation or electrical phenomena. Acoustic energy is carried liquid by the back and forth motion of the molecules along the direction of propagation. This produces alternate adiabatic compressions and rarefactions, together with corresponding changes in density and temperature; further attention is directed to references 14 and 24 referred to in the reference list attached hereto. However, it has been found, and in accordance with the teachings of the present invention, that particular advantages are achieved wherein, with regard to the apparatus of FIGS. 2 and 3, the ultrasonic energy is transmitted to the sewage at a frequency within the range from 20kHz to 50kHz; still further, it has been found that still more advantageous results can be achieved if the ultransonic energy is transmitted to the liquid at a frequency range from 20kHz to 30kHz.

Figure 4:
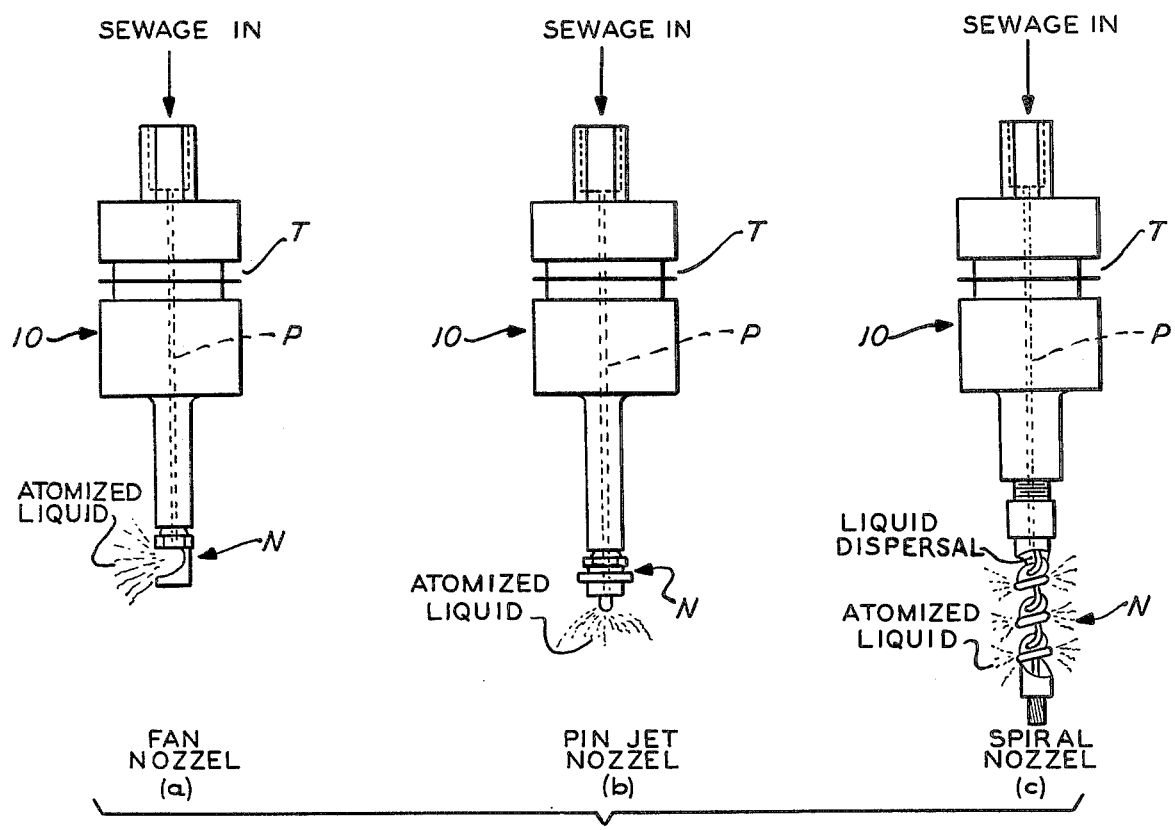
FIG. 4 is an illustration of various configurations of electroacoustic horns and nozzles particularly useful in the practice of the apparatus and processes of the present invention, such being identified as 4(a), 4(b) and 4(c)
Figure 8:
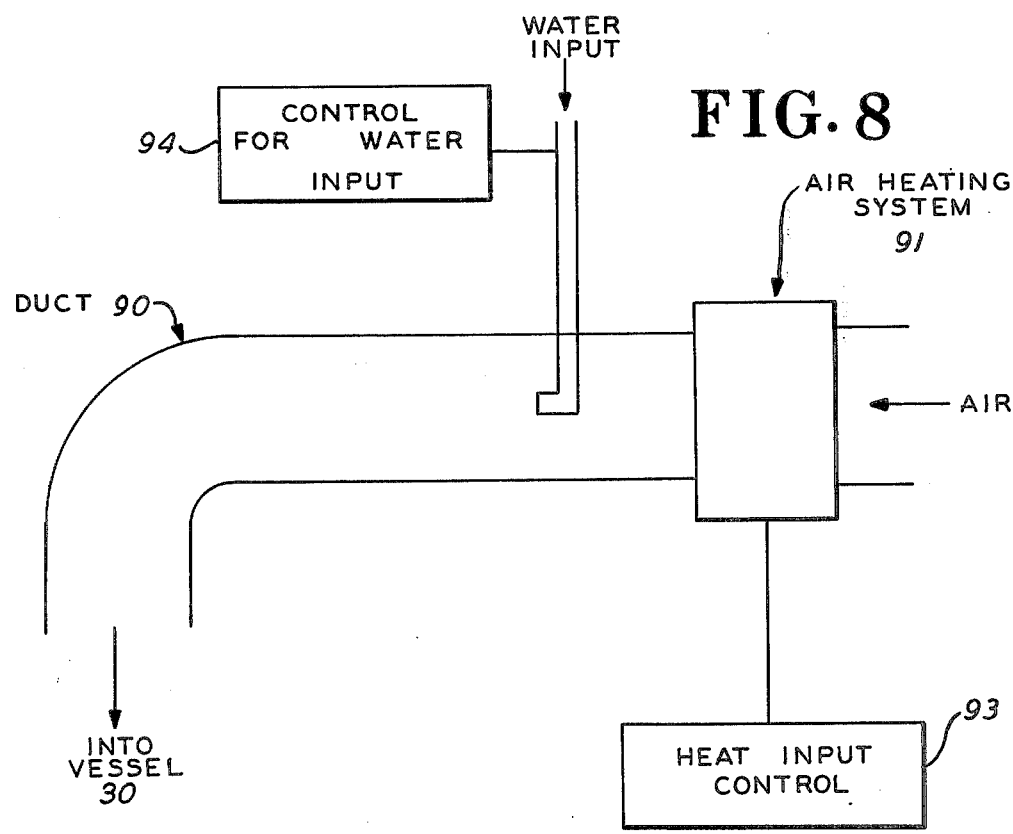
FIG. 8 is a diagrammatic presentation illustrating apparatus particularly useful in aiding and practicing certain processes of the present invention, namely, the avoidance of a temperature drop in the sewage during its absorption of air.
Figure 7:
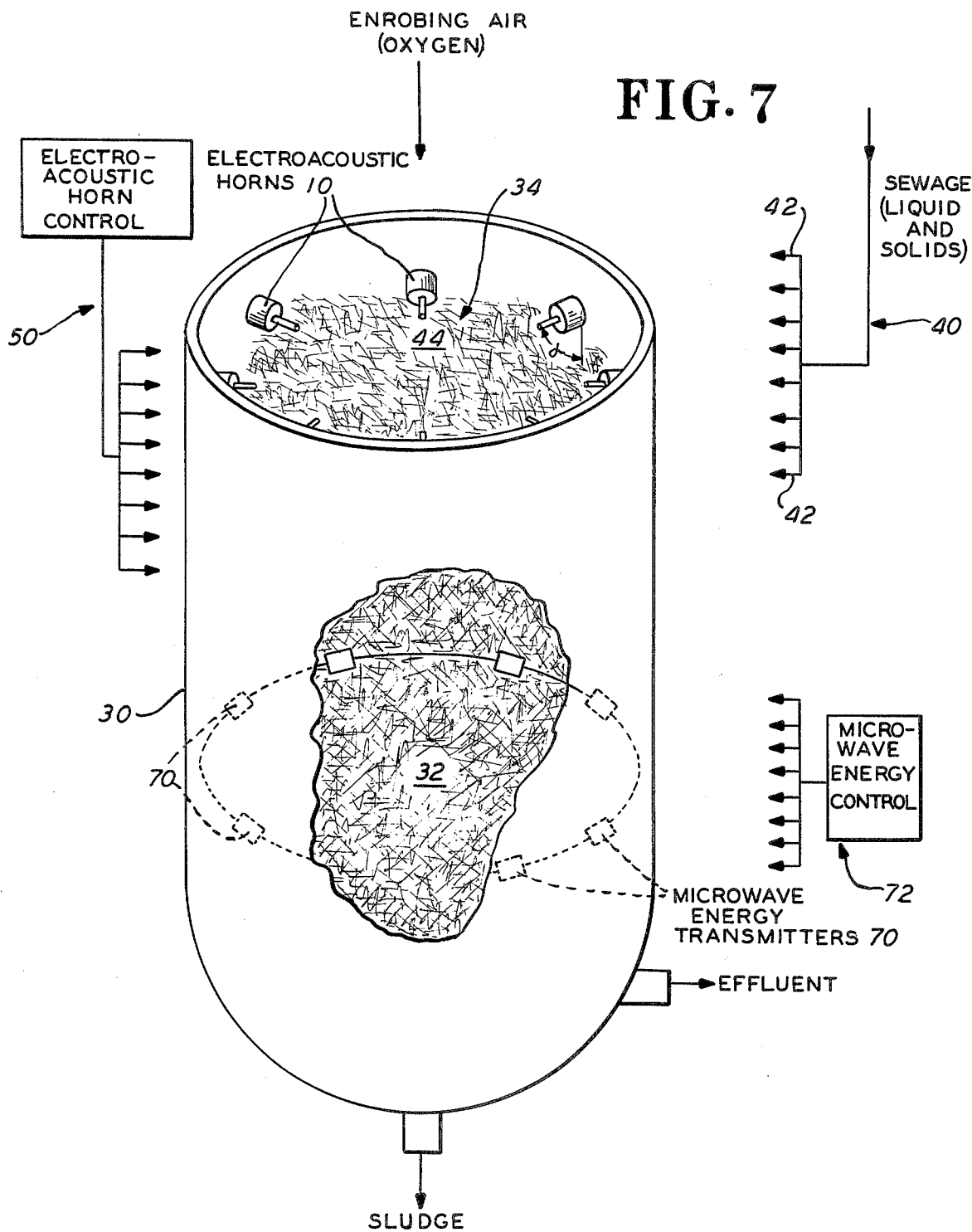
FIG. 7 is a diagrammatic presentation of apparatus embodying the present invention and which apparatus is particularly useful in practicing certain processes of the present invention.

Referring now to FIG. 4, there are shown alternate embodiments of the electroacoustic horn 10 of FIGS. 2 and 3 which have been found to be particularly useful in the present invention. The electroacoustic horns of FIG. 4 include nozzle protions N. The nozzle N of the electroacoustic horn of FIG. 4(a) is a fan nozzle, the nozzle of FIG. 4(b) is a pin jet nozzle, and the nozzle of FIG. 4(c) is a spiral nozzle provided with spiral convolutions as shown and having a needle disposed centrally of the spiral convolutions.

It will be noted that each electroacoustic horn is provided with a centrally formed passageway P for receiving sewage, and it will be further noted that the nozzles N are aligned concentrically with their respectively associated passageways P.

Sewage enters the passageway P, in the direction of the arrows, and flows through the passageway whereby, upon suitable energization of the electroacoustic horns, ultrasonic energy is transmitted to the sewage and the sewage is atomized as shown.

In particular regard to the embodiment of FIG. 4(c), it will be understood, that the sewage flowing through the passageway P strikes the needle and is dispersed to reduce the particle size of the sewage liquid and to enrobe the reduced liquid particles with additional air for utilization by the aerobic bacteria, and, the dispersed liquid collects on the surfaces of the spiral convolutions in the form of a thin film whereat, upon ultrasonic energy being applied to the thin film of sewage by the electroacoustic horn, the thin film of sewage is atomized to further reduce the liquid particle size of the sewage liquid and to further enrobe the further reduced liquid particles with additional air to provide the aerobic bacteria with additional oxygen in the bio-chemical oxidation of the organic matter included in the sewage.

It will be understood by those skilled in the art that the electroacoustic horns or concentrator horns 10 may be, for example, step horns, conical horns, exponential horns, cateroidal horns and other horns, for example the electroacoustic horns disclosed in reference 26 cited in the references referred to above and attached hereto. Further, that vibratory energy, for example, may be transmitted to the horns by an electrostrictive piezoelectric or magnetostrictive transducer portion T.

Referring in particular to FIGS. 4(*a*) and (*b*), it will be understood by those skilled in the art, that advantageous and highly desirable results can be achieved without first converting the sewage to a thin film and without first preheating the sewage. Hence, it will be understood, that it is within the contemplation of the present invention to transmit ultrasonic energy to sewage including liquid, solid matter and aerobic bacteria, to atomize and enrobe additional oxygen without either previously converting to a thin film and/or previously preheating the sewage or air or hydrating the air.

It will be further understood by those skilled in the art that due to the vibratory energy applied to the nozzles, the nozzles are self-cleaning. The vibratory energy tends to inhibit the growth of organisms and aids in dislodging solid matter.

Referring now to FIG. 5, there is shown additional apparatus embodying the present invention and which apparatus is particularly useful in practicing certain processes of the present invention, in particular, those processes utilizing the synergistic effects of ultransonic energy and ultraviolet light.

More particularly, the apparatus of FIG. 5 may include a vessel, tank or other container 30 providing an interior chamber 32 which, as shown, is provided with an opening 34 exposed to the air. A plurality of electroacoustic horns 10 are disposed radially around the interior of the chamber 32, adjacent the opening 34, and suitably secured to the interior walls of the vessel 30. Sewage, including liquid, solid organic matter and aerobic bacteria, may be suitably subdivided into a plurality of streams 42 as shown schematically at 40 and the individual streams 42 are each fed to a respective one of the electroacoustic horns 10. The electroacoustic horns 10 may be advantageously any one of the electroacoustic horns shown and previously described in FIG. 4 or any other design found advantageous. Further, it will be understood that the electroacoustic horns are provided with suitable control means as shown generally at 50 for applying the electroacoustic energy to the horns to energize the horns and cause the horns to transmit ultrasonic energy to the individual streams of sewage 42 to atomize the sewage (as shown diagrammatically at 44) and reduce the sewage liquid particles in size and to enrobe the reduced liquid particles with additional air to be utilized by the aerobic bacteria in the bio-chemical oxidation of the solid organic matter. Subsequent to being atomized, the sewage collects and/or depositions within the vessel 30, the heavier solids may be exited as sludge as shown, and the collected liquid and dissolved solid matter may be exited as effluent as shown.

It will be further understood by those skilled in the art that the electroacoustic horn control apparatus 50 may be structured, in a manner known in the art, to operate the electroacoustic horns 10 in a common manner or alternatively, the electroacoustic horn control apparatus 50 may be structured to operate each electroacoustic horn 10 independently from any other electroacoustic horn 10.

With further regard to FIG. 5, and in accordance with a further teaching of the present invention, a plurality of ultraviolet lamps 60 may be provided interiorly of the vessel 30, adjacent the vessel opening 34 and adjacent and interspersed between the electroacoustic horns 10, the ultraviolet lamps 60 may be suitably secured to the interior wall of the vessel 30. It will be further understood by those skilled in the art that the ultraviolet lamps 60 may be provided with suitable lamp control apparatus 62 for suitably energizing the ultraviolet lamps 60. The ultraviolet lamp control apparatus 62 may be structured and operated, in a suitable manner, to transmit energy to the ultraviolet lamp 60 in a common manner, or alternatively, may be suitably structured and operated to transmit energy to each ultraviolet lamp 60 independently of any other ultraviolet lamp 60.

It has been found in accordance with the teaching of the present invention that the ultraviolet light may be advantageously transmitted to the atomized sewage at a range from 1800A to 4500A.

In the practice of the process of the present invention utilizing the synergistic effects of ultrasonic energy and ultraviolet light, the sewage is atomized by the electroacoustic horns 10 as taught above, and the ultraviolet lamps 60 emit ultraviolet light and transmit the ultraviolet light to the atomized atmosphere to reduced particles of liquid and solid matter to sensitize unwanted microorganisms contained in the sewage for ready subsequent treatment, e.g., destruction by chemicals and/or radiation and/or other.

With regard to still a further teaching of the present invention and referring to FIG. 7, the teaching of the present invention utilizing the synergistic effects of ultrasonic energy and microwave energy will now be set forth.

It will be understood that the apparatus will be provided with the electroacoustic horns 10 as shown and described above, and a plurality of microwave energy transmitters 70 will be provided within the chamber 32 and interiorly of the vessel 30 by being suitably secured to the interior walls of the vessel 30. The microwave energy transmitters 70 are disposed interiorly of the chamber 32 below the electroacoustic horns 10 as shown.

In operation, the sewage will be applied to the electroacoustic horns 10 whereupon the ultrasonic energy will be transmitted to the sewage to atomize the sewage (as shown diagrammatically at 44) as taught above. The atomized sewage will produce a humid atmosphere, and, the microwave energy transmitter 70 will be suitably energized by microwave energy control apparatus 72 and caused to emit microwave energy which will be coupled to the reduced particles of liquid and solid matter by the humid atmosphere. The microwave energy will decontaminate, to a predetermined degree, the surfaces of the reduced particles of liquid and solid matter through thermal and non-thermal effects; it will be understood by those skilled in the art that the expression "surface" denotes some depth and hence a volume having a shallow depth.

It has been found, and in accordance with the teaching of the present invention, that in the treatment of sewage utilizing the synergistic effects of ultrasonic and microwave energy that microwave energy may be advantageously transmitted to the sewage at a frequency within the range from 100MHz to 300,000MHz and that the microwave energy may be advantageously transmitted to the humid atmosphere at an energy level higher than 0.01 watt/$cm^3$.

Referring again to FIGS. 5 and 7, it has been found that the electroacoustic horns 10 may be advantageously positioned at a predetermined angle $\alpha$ (less than 90°) with respect to the wall of the vessel 30. It will be understood by those skilled in the art that the angle $\alpha$ will be determined by such considerations, inter alia, as the pressure in the liquid, rate of flow of liquid, level of acoustic energy transmitted, temperature of the liquid, and nozzle configuration. In addition, it will be understood that it is within the contemplation of the present invention that the electroacoustic horns and nozzles may be mounted adjustably, by suitable means, with respect to the walls of the vessel 30 so as to permit the horns and nozzles to be inclined at a variable angle $\alpha$, less than 90°, with respect to the vessel walls.

Referring now to FIG. 6, it will be understood that the pressure vessel 30 may be provided with the hourglass configuration shown so as to create a Venturi effect for drawing air into the chamber 34.

Referring now to FIG. 8, it will be understood that the air (enrobing air) of FIG. 3 and the air (enrobing air or air into which the various reduced parties are projected) input to pressure vessel 30 may be passed through a duct 90 having a suitable means 91 for preheating the air to a predetermined temperature to compensate for any heat loss in the process of projecting the reduced particles of the aforementioned liquid, liquid and solids, or thin film, into such air. Further, with regard to the embodiment of FIG. 7, the apparatus of FIG. 8 may also include means 94 for combining with the means 91 to hydrate the air input to the vessel 30 by passing the air through the duct 90 to hydrate the air to a predetermined percent humidity to assist in producing the humid atmosphere for coupling the microwave energy. Suitable controls 93 and 94 are provided to control the heat input and water input, respectively. It has been found that the enrobing air may be advantageously pre-heated to a temperature of approximately 98° F, and that the air in the embodiment of FIG. 7 may be advantageously humidified to 30% to 90%.

Referring again to FIG. 1, it has been found that the present invention as taught with regard to FIGS. 2 and 3, and with reference to existing sewage treatment plants may be advantageously positioned at points A and/or B to operate on the above-described primary and secondary effluents. Also, with regard to existing sewage treatment plants, the present invention as taught with regard to FIGS. 5 and 7 may be advantageously positioned at point C.

It will be still further understood by those skilled in the art, that it is within the contemplation and scope of the present invention to include the embodiment of FIG. 3 at points A and/or B, to operate on the primary and/or secondary effluents (referred to as intraeffluents) and to also include the embodiment of FIG. 5 or FIG. 7 at point C.

It will be further understood by those skilled in the art that many modifications and variations may be made in the present invention without departing from the spirit and scope thereof.

I claim:

1. The process of sonobioaeration for treating sewage utilizing an electroacoustic horn, said sewage including liquid, solid organic matter and aerobic organisms comprising the steps of:
   exposing said electroacoustic horn to air;
   converting said sewage to a thin film;
   applying said thin film of sewage to the surface of said electroacoustic horn; and
   transmitting ultrasonic energy with said electroacoustic horn to said thin film of sewage, in the presence of said air, to atomize the thin film of sewage to reduce the particle size of said liquid and enrobe said reduced liquid particles with said air to provide said aerobic organisms with additional oxygen, derived from said air, for said aerobic organisms to utilize in the process of bio-chemical oxidation whereby said aerobic organisms convert said organic matter to a more stable compound.

2. The process of sonobioaeration for treating sewage utilizing an electroacoustic horn, said sewage including liquid, solid organic matter and aerobic organisms, comprising:
   exposing said elecrtroacoustic horn to air,
   passing said sewage through a passageway formed internally, of said electroacoustic horn,
   impinging said sewage against an impinging member provided centrally of a spiral nozzle attached to said electroacoustic horn and aligned concentrically with said passageway disperse said sewage and to reduce the particle size of said liquid and to enrobe the reduced liquid particles with said air to enhance the air to liquid absorption of said liquid,
   collecting a predetermined portion of said dispersed sewage on the convolutions of said nozzle to form said sewage into a thin film; and
   transmitting ultrasonic energy in the presence of said air to said sewage in said thin firm form collected on said nozzle convolutions to further reduce the size of said liquid particles and to further enrobe said liquid particles of further reduced size with additional air, said additional air providing oxygen for said aerobic organisms to utilize in the biochemical oxidation process of converting said organic matter to a more stable compound.

3. The process according to claim 2 wherein said ultrasonic energy is transmitted to said thin film at a frequency within the range from 10kHz to 100kHz.

4. The process according to claim 2 wherein said ultrasonic energy is transmitted to said thin film at a frequency within the range from 20kHz to 50kHz.

5. The process according to claim 2 wherein said ultrasonic energy is transmitted to said thin film at a frequency within the range from 20kHz to 30kHz.

6. The process according to claim 2 including the further step of pre-heating said enrobing air to a predetermined temperature to compensate for any heat loss in the process of reducing the particle size of said thin film in the presence of said enrobing air.

7. The process according to claim 6 wherein said predetermined temperature is approximately 98° F.

* * * * *